US011138739B2

(12) United States Patent
Dwivedi et al.

(10) Patent No.: US 11,138,739 B2
(45) Date of Patent: Oct. 5, 2021

(54) HEART SEGMENTATION METHODOLOGY FOR CARDIAC MOTION CORRECTION

(71) Applicant: KONINKLIJKE PHILIPS N.V., Eindhoven (NL)

(72) Inventors: Shekhar Dwivedi, Willoughby Hills, OH (US); Chuanyong Bai, Solon, OH (US); Zhiqiang Hu, Twinsburg, OH (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 108 days.

(21) Appl. No.: 16/349,807

(22) PCT Filed: Nov. 20, 2017

(86) PCT No.: PCT/EP2017/079783
§ 371 (c)(1),
(2) Date: May 14, 2019

(87) PCT Pub. No.: WO2018/099750
PCT Pub. Date: Jun. 7, 2018

(65) Prior Publication Data
US 2019/0362497 A1 Nov. 28, 2019

Related U.S. Application Data

(60) Provisional application No. 62/427,172, filed on Nov. 29, 2016.

(51) Int. Cl.
*G06T 7/12* (2017.01)
*G06T 7/149* (2017.01)

(52) U.S. Cl.
CPC ........... *G06T 7/12* (2017.01); *G06T 7/149* (2017.01); *G06T 2207/10016* (2013.01);
(Continued)

(58) Field of Classification Search
CPC . G06T 7/12; G06T 7/149; G06T 2207/10016; G06T 2207/10104; G06T 2207/20124; G06T 2207/30048
See application file for complete search history.

(56) References Cited

U.S. PATENT DOCUMENTS 7,953,265 B2   5/2011  Sirohey
8,509,506 B2   8/2013  Ciofolo
(Continued)

FOREIGN PATENT DOCUMENTS

WO   2012153231 A2   11/2012

OTHER PUBLICATIONS

International Search Report and Written Opinion for PCT/EP2017/079783, dated Mar. 2, 2018.
(Continued)

*Primary Examiner* — Yuwen Pan
*Assistant Examiner* — Umair Ahsan (57) ABSTRACT

A machine learning guided image segmentation process is performed by an electronic processor (10). Image segmentation (22) is performed to generate an initial segmented representation (50) of an anatomical structure in the medical image. Parameters of a geometric shape are fitted (52) to the anatomical structure in the medical image to produce initial fitted shape parameters (54). A classification is assigned for the anatomical structure in the medical image using at least one classifier (60) operating on the initial fitted shape parameters and the initial segmented representation of the anatomical structure. A final segmented representation (72) of the anatomical structure in the medical image is generated by operations including repeating (70) the image segmentation using the classification as prior knowledge. In illustrative embodiments, the anatomical structure is a heart and the geometric shape is an ellipsoid.

17 Claims, 6 Drawing Sheets

(52) U.S. Cl.
CPC ............... *G06T 2207/10104* (2013.01); *G06T 2207/20124* (2013.01); *G06T 2207/30048* (2013.01)

(56) References Cited

U.S. PATENT DOCUMENTS

| | | |
|---|---|---|
| 9,299,157 B2 | 3/2016 | Lilje |
| 2010/0284598 A1* | 11/2010 | Zhao .................. G06T 7/33 382/131 |
| 2012/0123253 A1* | 5/2012 | Renisch ............. A61B 6/5247 600/425 |
| 2013/0208964 A1 | 8/2013 | Dwivedi |
| 2018/0365838 A1* | 12/2018 | Lorenz .................. G16H 50/50 |

OTHER PUBLICATIONS

Peng, Peng et al "A Review of Heart Chamber Segmentation for Structural and Functional Analysis using Cardiac Magnetic Resonance Imaging", Magnetic Resonance Materials in Physics, Biology and Medicine, vol. 29, No. 2, pp. 155-195, Jan. 2016.

Germano, Guido et al "Automatic Reorientation of Three-Dimensional, Transaxial Myocardial Perfusion SPECT Images", Journal of Nuclear Medicine, vol. 36, No. 6, pp. 1107-1114, Jun. 1995.

\* cited by examiner

FIG. 6

HEART SEGMENTATION METHODOLOGY FOR CARDIAC MOTION CORRECTION

CROSS-REFERENCE TO PRIOR APPLICATIONS

This application is the U.S. National Phase application under 35 U.S.C. § 371 of International Application No. PCT/EP2017/079783, filed on Nov. 20, 2017, which claims the benefit of U.S. Provisional Patent Application No. 62/427,172, filed on Nov. 29, 2016. These applications are hereby incorporated by reference herein.

FIELD

The following relates generally to the image reconstruction arts, medical imaging arts, radiology workstation arts, and related arts.

BACKGROUND

Heart segmentation in functional clinical imaging is a challenging problem. Accurate heart segmentation facilitates accurate quantitative medical image analysis and the drawing of accurate clinical findings for diagnostic, treatment monitoring, or other purposes. Cardiac boundaries determined by heart segmentation are also used in cardiac motion correction. In a typical cardiac PET imaging scenario, a radiotracer is administered into the patient's bloodstream, which is then taken up by cardiac tissue, especially the walls of the left ventricle which provides cardiac output to the aorta and body vascular system, and the walls of the right ventricle and atrial chambers. Various automatic heart segmentation algorithms may be used to segment the cardiac walls. In a typical segmentation approach, a deformable mesh model is iteratively fitted to anatomical edges (e.g. defined by large image gradients). To improve accuracy, the iterative fitting may be constrained by anatomical constraints, e.g. a heart volume mask can be applied to restrict the mesh to an expected cardiac region. In practice, however, the automated heart segmentation sometimes fails for a particular patient, and manual intervention by the technologist or radiologist is required to accurately contour the heart boundaries in PET images of that patient.

Clinically, the cardiac PET images provide functional information as to the efficacy of uptake into the various cardiac tissues. By way of illustration, low or non-existent radiotracer signal from a chamber wall or other feature (that is, low uptake) generally indicates damaged or necrotic tissue—such abnormal features in the PET image are thus particularly relevant for accurate cardiac PET diagnoses.

While described with reference to heart segmentation of PET images, improvements disclosed herein will also find application to segmentation of other anatomical structures, and/or to images acquired by other medical imaging modalities, e.g. magnetic resonance (MR) imaging, transmission computed tomography (CT) imaging, single photon emission computed tomography (SPECT) imaging, and so forth.

The following discloses a new and improved systems and methods that address the above referenced issues, and others.

SUMMARY

In one disclosed aspect, an image processing device comprises an electronic processor and at least one non-transitory storage medium storing instructions readable and executable by the electronic processor to perform an image segmentation process on a medical image. The image segmentation process includes: performing image segmentation to generate an initial segmented representation of an anatomical structure in the medical image; fitting parameters of a geometric shape to the anatomical structure in the medical image to produce initial fitted shape parameters; assigning a classification for the anatomical structure in the medical image using at least one classifier operating on the initial fitted shape parameters and the initial segmented representation of the anatomical structure; and generating a final segmented representation of the anatomical structure in the medical image by operations including repeating the image segmentation using the classification as prior knowledge.

In another disclosed aspect, a non-transitory storage medium stores instructions readable and executable by an electronic processor to perform an image segmentation process on an anatomical structure in a medical image depicting activity of a radiopharmaceutical in an imaged patient. The image segmentation process includes: fitting parameters of a geometric shape to the anatomical structure in the medical image to produce initial fitted shape parameters; assigning a classification for the anatomical structure in the medical image using at least one classifier operating on at least the initial fitted shape parameters; and performing image segmentation to generate a segmented representation of the anatomical structure in the medical image using the classification as prior knowledge in performing the image segmentation. The classification is assigned from a set of classifications including at least one activity leakage classification and at least one partial or missing activity uptake classification. In some embodiments, the anatomical structure is a heart and the at least one activity leakage classification includes a classification representing activity leakage into a right ventricle, and a classification representing activity leakage into an abdomen. In some embodiments, the anatomical structure is a heart and the at least one partial or missing activity uptake classification includes a classification representing partial or missing activity uptake into an apical region, a classification representing partial or missing activity uptake into a region located between apical and aortic valves, and a classification representing partial or missing activity uptake into a region located between apical and mitral valves.

In another disclosed aspect, an image segmentation method is disclosed. Parameters of a geometric shape are fitted to an anatomical structure in a medical image to produce initial fitted shape parameters. The anatomical structure is classified based on at least the fitted geometric shape into one or more classifications of a classification scheme including a normal classification and at least one abnormal classification. Image segmentation is performed to generate a segmented representation of the anatomical structure in the medical image using the classification as prior knowledge in performing the image segmentation. The fitting, classifying and image segmentation are suitably performed using an electronic processor.

One advantage resides in providing improved automated anatomical segmentation in the case of an anatomical abnormality.

Another advantage resides in providing automated anatomical segmentation of an anatomical feature for a wider range of patients, particularly those for whom the anatomical feature exhibits abnormalities in the images.

Another advantage resides in providing one or more of the foregoing benefits particularly in the case of cardiac imaging.

Another advantage resides in providing one or more of the foregoing benefits particularly in the case of positron emission tomography (PET) imaging.

Another advantage resides in providing one or more of the foregoing benefits particularly in the case of cardiac PET imaging.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Existing automated heart segmentation approaches are generally designed to segment a normal heart, which has a fairly regular ellipsoidal shape. These techniques usually work well for a normal heart, but commonly fail in the case of significant heart abnormality. This is problematic since a cardiac PET scan is typically ordered in the case of a patient with cardiac disease or the like, and this population is much more likely to exhibit significant heart abnormalities of the type that can cause automated heart segmentation to fail. When failure occurs, valuable clinician time is spent performing manual contouring or otherwise manually performing or correcting the heart segmentation.

In some embodiments disclosed herein, a two-stage shape fitting technique is employed to improve the cardiac myocardium segmentation. An illustrative approach begins with an automated heart segmentation of substantially any type, which may or may not produce a satisfactory result. In a second, approximate "segmentation", an ellipsoid is fit to the heart. The ellipsoid is recognized herein as an appropriate geometric shape for approximately fitting the heart with a small number of parameters. To improve efficiency, the ellipsoid fitting process may utilize information from the initial heart segmentation, such as the center of mass and/or the azimuth and elevation angles of the segmented heart, as initial parameters. Features are extracted from both the heart segmentation (e.g., the center of mass) and the fitted ellipsoid (e.g. lengths of major axes, azimuth and elevation angles, and ellipsoid center-of-mass).

A heart image type classifier receives the foregoing set of features and outputs a corresponding heart image type. For example, in illustrative embodiments herein the heart image types include: normal; partial uptake (resulting in thin myocardial regions); types in which various myocardial segments are missing; uptake leakage into the right ventricle; and uptake leakage into the abdomen. As these various types are not necessarily mutually exclusive (e.g. a heart image could exhibit both a missing myocardial segment and leakage into the abdomen), in some embodiments the heart image type classifier may output two or more image types if appropriate for a given heart image. These are merely illustrative heart image types, and additional and/or other image types may be suitable depending upon the cardiac PET imaging application, the choice of radiotracer, and so forth. Furthermore, for other anatomical targets beside the heart, another shape model besides an ellipsoid may be more appropriate.

Based on the heart image type classification, the shape modeling (ellipsoidal modeling in the illustrative heart segmentation) is repeated with an ellipsoidal shape adjusted based on the image type. This second fitted shape is then used as prior information for a second repetition of the myocardium segmentation. In particular, the (second fitted ellipsoid shape provides a boundary or constraint or mask on the segmentation (e.g. to "plug" any "leaks"). Optionally, an iterative ellipsoidal ballooning algorithm may also be applied to the second fitted shape to more precisely define the shape of the myocardium and account for any missing myocardium segments. Again, for other anatomical targets beside the heart, another shape model besides an ellipsoid may be more appropriate.

Figure 1:
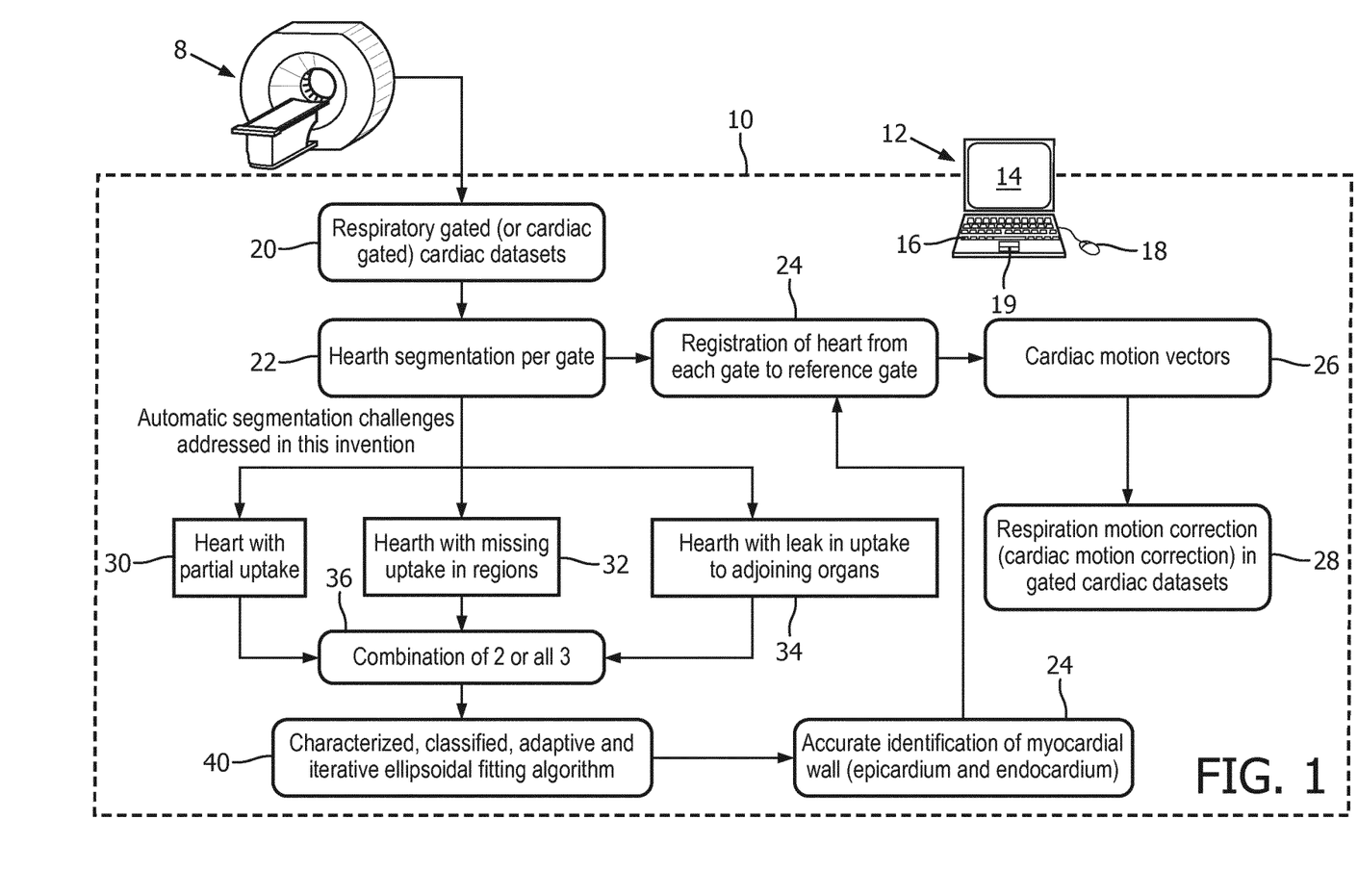
FIG. 1 diagrammatically shows an illustrative imaging device including improved heart segmentation as disclosed herein.

With reference to FIG. 1, an illustrative imaging device comprises a positron emission tomography (PET) imaging scanner 8 and an electronic processor 10 programmed to process imaging data acquired by the PET imaging scanner 8 to generate one or more reconstructed images. For the purposes of this illustrative embodiment, it is assumed that the PET imaging scanner 8 acquires cardiac PET images, either with or without time-of-flight (TOF) localization of the lines of response that are reconstructed to form the image. While the illustrative embodiment employs PET (encompassing both non-TOF and TOF-PET), this is merely an illustrative example and the disclosed segmentation techniques are also applicable to like types of medical imaging modalities, such as single photon emission computed tomography (SPECT) imaging, magnetic resonance (MR) imaging, or transmission computed tomography (CT) imaging. By way of some non-limiting illustrative examples, the illustrative PET imaging scanner 8 may be the PET gantry of a Vereos™ Digital PET/CT scanner or an Ingenuity™ TF PET scanner, an example of a gamma camera for acquiring SPECT images is the Forte™ nuclear medicine camera, while an example of a CT scanner is the CT gantry of the aforementioned Vereos™ Digital PET/CT scanner. These illustrative commercial imaging scanners are available from Koninklijke Philips N.V., Eindhoven, the Netherlands. Likewise, while cardiac PET imaging and particularly heart segmentation is the illustrative application, the disclosed segmentation techniques may also be applied for segmenting other anatomical structures, e.g. other organs. Although, as compared with PET, the contrast and intensity distribution is generally different for other modalities such as CT and MR, the disclosed approaches of classifying the organ defects and then using a shape classifier and a machine learning algorithm to identify the defect in the incoming patient can be readily applied to these modalities.

The electronic processor 10 may, for example, be embodied as a computer 12 (e.g. a desktop computer, network-based server computer, a dedicated PET control computer, various combinations thereof, or so forth) that executes instructions read from one or more non-transitory electronic storage media (e.g. one or more hard drives, optical disks, solid state drives or other electronic digital storage devices, various combinations thereof, or so forth) that stores the instructions. The computer 12 includes or has operative access to at least one display 14 (e.g. an LCD display, plasma display, or so forth), and includes or has operative access to at least one user input device via which a user can input information. The illustrative user input devices include a keyboard 16 and a mouse 18, trackpad 19, touch-sensitive overlay of the display 14, and/or other pointing device. These are intended as non-limiting examples, and other user input devices are also contemplated.

The electronic processor 10 is programmed to perform control operations, i.e. PET imaging device control to acquire medical images (i.e. cardiac data sets) 20. In the illustrative example, cardiac and/or respiratory gating is optionally employed, e.g. using an electrocardiograph (ECG) device (not shown) to associate the PET imaging data with cardiac phase, and/or a respiratory monitor (not shown) to associate the PET imaging data with respiratory phase; and PET imaging data acquired during a particular cardiac or respiratory phase is reconstructed to produce a cardiac image for that phase. In the following, the particular cardiac or respiratory phase that is reconstructed is referred to as the "gate", and the reconstructed image for a particular gate (i.e. a particular cardiac or respiratory phase) is referred to herein as a "gate image". It should also be noted that a gate may encompass a phase range, or even a combination of two non-contiguous phase ranges, e.g. two non-contiguous phase ranges for which the heart is expected to be in a similar physical configuration.

FIG. 1 depicts segmentation and further processing to perform an illustrative motion correction. To this end, in an operation 22 the heart in each gate image is segmented, using any suitable heart segmentation algorithm, e.g. a mesh fitting, optionally constrained by a priori anatomical knowledge. In an operation 24, the segmented heart in the various gate images is spatially registered to a chosen reference gate image. In an operation 26, the amount of rigid translation and/or rotation (and optionally also local non-rigid deformational adjustment if the operation 24 employs a non-rigid spatial registration algorithm) is converted to cardiac motion vectors. In an operation 28, cardiac or respiratory motion correction is performed on the cardiac images based on the cardiac motion vectors.

Accuracy of the foregoing motion correction processing 22, 24, 26, 28 is predicated on the segmentation operation 22 providing an accurate heart segmentation—if this is not the case, then the performance of the downstream operations 24, 26, 28 will be compromised, or they may even fail to execute entirely. As noted previously, typical heart segmentation algorithms are fairly accurate for a normal heart, but are more likely to fail in the case of a patient with one or more heart abnormalities that manifest in the cardiac PET images. In view of this, approaches disclosed herein detect when the anatomical structure (e.g. heart) being segmented is abnormal (in a way that manifests in the image), and the segmentation is modified based on this prior knowledge to improve the final segmented representation of the anatomical structure.

Thus, for the illustrative heart segmentation of FIG. 1, the anatomical structure is classified using a classification scheme that includes a normal classification (not shown in FIG. 1) and at least one abnormal classification, namely in the illustrative example a heart with partial radiotracer uptake classification 30, a heart with missing radiotracer uptake in certain regions classification 32, and a heart with radiotracer uptake leakage into adjoining organs 34. As these abnormalities are not necessarily mutually exclusive, the possibility of multiple such abnormalities 36 is also optionally included in the classification scheme. These are merely some illustrative abnormalities that may be detected, and other normal/abnormal classification schemes are contemplated. In some illustrative embodiments for the heart, the classification scheme 30, 32, 34, 36 is applied by way of an iterative ellipsoidal fitting algorithm 40 that outputs more accurate identification 42 of the myocardial wall. Use of an ellipsoidal shape in the fitting leverages the recognition herein that a normal heart is generally ellipsoidal in shape.

The disclosed approaches provide robust generation of myocardial boundary in gated PET reconstructed images in an automatic and reproducible fashion. Abnormal uptake in the walls, leakage of uptake in adjoining regions and various combinations of such abnormalities are addressed by detecting the abnormality and adjusting the segmentation accordingly. In illustrative embodiments disclosed herein, an adaptive and iterative ellipsoidal shape fitting algorithm to identify the characterized abnormal myocardial boundary. More generally, a geometric shape that comports well with the general shape of an anatomical structure undergoing segmentation may be used for detection of abnormalities.

In illustrative approaches for cardiac segmentation, a classification algorithm detects heart abnormalities based on characteristics of myocardial wall abnormality in functional images (e.g. PET or SPECT images imaging uptake of a radiotracer). A myocardial abnormality is defined based on the uptake identified in the segmented myocardial wall. Localized uptake is identified (for classification) in predefined regions of myocardial walls. A shape classifier characterizes (i.e. classifies) the patient dataset (i.e. the PET or SPECT heart image) with the features of the fitted shape (an ellipsoid in the illustrative embodiments) to the segmented myocardial walls. An adaptive iterative ellipsoidal fitting algorithm accurately determines the myocardial wall (irrespective of the presence of abnormality or leakage of activity). Optionally, an ellipsoidal ballooning algorithm is further used to determine accurate wall thickness.

The disclosed automatic, robust cardiac segmentation algorithm has been tested on a range of abnormal patient datasets including patients with moderate to high level of cardiac abnormality. The disclosed approaches directly address abnormalities present in the PET image of the heart, and use shape and pattern recognition to detect the abnormality. In the illustrative embodiments, the addressed abnormalities include abnormalities in the myocardial boundary or other types of abnormalities such as radiotracer leakage. Abnormalities in the existing patient datasets are identified, and the shape modeling is tuned to accurately identify the cardiac boundaries. The resulting fitted shape may, for example, be used as prior information to improve execution (or a repeated execution) of the image segmentation algorithm. The fitted shape may, for example, serve as a mask.

Figure 2:
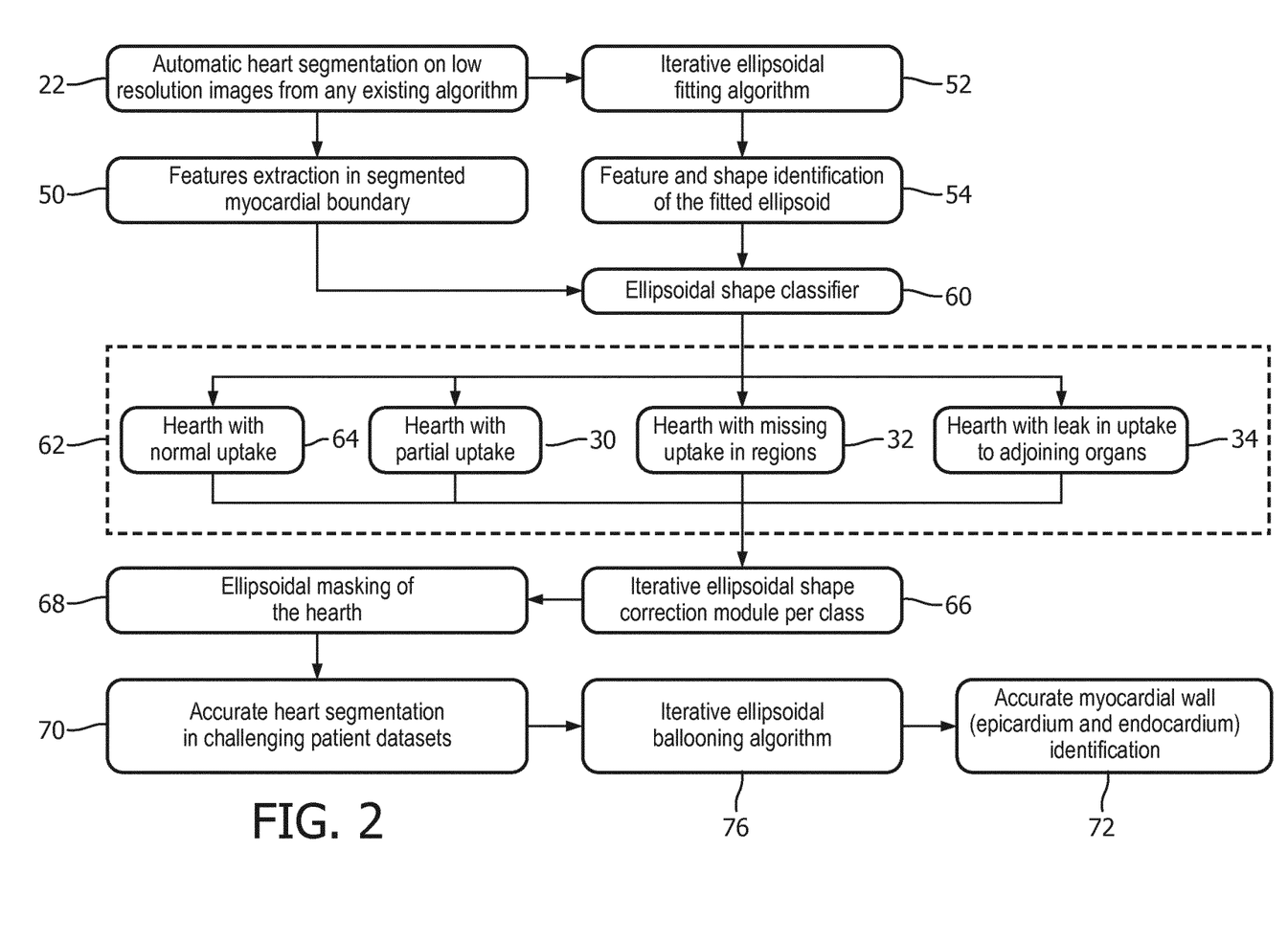
FIG. 2 diagrammatically shows a more detailed embodiment of automatic heart segmentation in the case of contrast-enhanced gated positron emission tomography (PET) imaging, which is suitably performed by the imaging device of FIG. 1.

With reference now to FIG. 2, an illustrative image segmentation process suitably performed by the electronic processor 10 is described. The illustrative example of FIG. 2 is particularly directed to accurate segmentation of the left ventricle. In operation 22 (already described with reference to FIG. 1), PET reconstructed images are fed to an automatic cardiac segmentation algorithm. This algorithm extracts the myocardial boundaries. In an operation 50, one or more features (F1) are extracted from segmented left ventricle (LV1). In an operation 52, the left ventricle (LV1) is subject to an iterative and automatic ellipsoidal fitting algorithm. In an operation 54, characteristics (i.e. features) of the ellipsoid are extracted (E1). A feature vector representing the anatomical structure (here the LV1) in the medical image is generated from the initial fitted shape parameters 54 and the initial segmented representation 50 of the anatomical structure.

An ellipsoidal shape classifier 60 operates on the feature vector to assign a classification for the anatomical structure (here LV1) in the medical image. In illustrative FIG. 2, the shape classifier 60 assigns one or more classifications from a classification scheme 62 that includes a normal classification 64 and at least one abnormal classification. The available illustrative abnormal classifications include the partial radiotracer uptake classification 30, heart with missing radiotracer uptake in certain regions classification 32, and heart with radiotracer uptake leakage into adjoining organs 34, which have already been discussed with reference to FIG. 1. More generally, the geometric shape classifier 60 is trained on a training set derived from cardiac patient PET imaging studies, with the PET images labeled in accord with the pre-defined abnormalities of the classification scheme 62, for example by a physician, radiologist, or other medical professional. While a single geometric shape classifier 60 is illustrated, it will be appreciated that this classifier 60 may optionally be embodied by two or more classifiers; for example, the classifier 60 may comprise a set of binary classifiers, each trained to assign a binary classification value for the anatomical structure (e.g. LV1) in the medical image, in which (as illustration) binary value "1" indicates the imaged LV1 exhibits the abnormality while binary value "0" indicates the imaged LV1 does not exhibit the abnormality. Other classifier architectures can be employed, e.g. the classifier 60 could be a multi-class classifier. Preferably, the classifier 60 is a multi-label classifier in the sense that it can assign two or more different abnormality labels to a single LV1 image, for example if that imaged LV1 exhibits both partial uptake and leakage.

The shape classifier 60 operating on the feature vector generated from F1 and E1 outputs identification of a unique class (CL) in which the patient heart image falls. In an operation 66, adaptive ellipsoidal fitting is repeated for the class CL to generate an ellipsoidal mask 68. This mask is used in a repeated performance 70 of the automatic cardiac segmentation algorithm of operation 22, in order to extract a typically more accurate myocardial boundary (MB) 72. In an optional operation 76, shape ballooning algorithm is applied on MB to improve accuracy of the wall thickness and ensure boundaries are maintained for motion correction and quantitative analysis.

In the following, some illustrative embodiments of the ellipsoidal shape classifier 60 are described. The classifier 60 detects scenarios in which the segmentation algorithm used in operation 22 is likely to fail. The classifier 60 is suitably trained on labeled training sets of heart images labeled by their exhibited abnormality or abnormalities (or labeled as "normal" 64 if the heart image exhibits no abnormality). The elliptical shape classifier 60 is used to categorize the three-dimensional (3D) heart image in accord with the classification scheme 62. These classes also possess certain characteristics identified automatically through the segmentation algorithm 22 and the elliptical shape fitting/classifying 52, 60. As shown in FIG. 2, in the illustrative example three major abnormality classes 30, 32, 34 are employed in the illustrative classification scheme 62.

Figure 3:
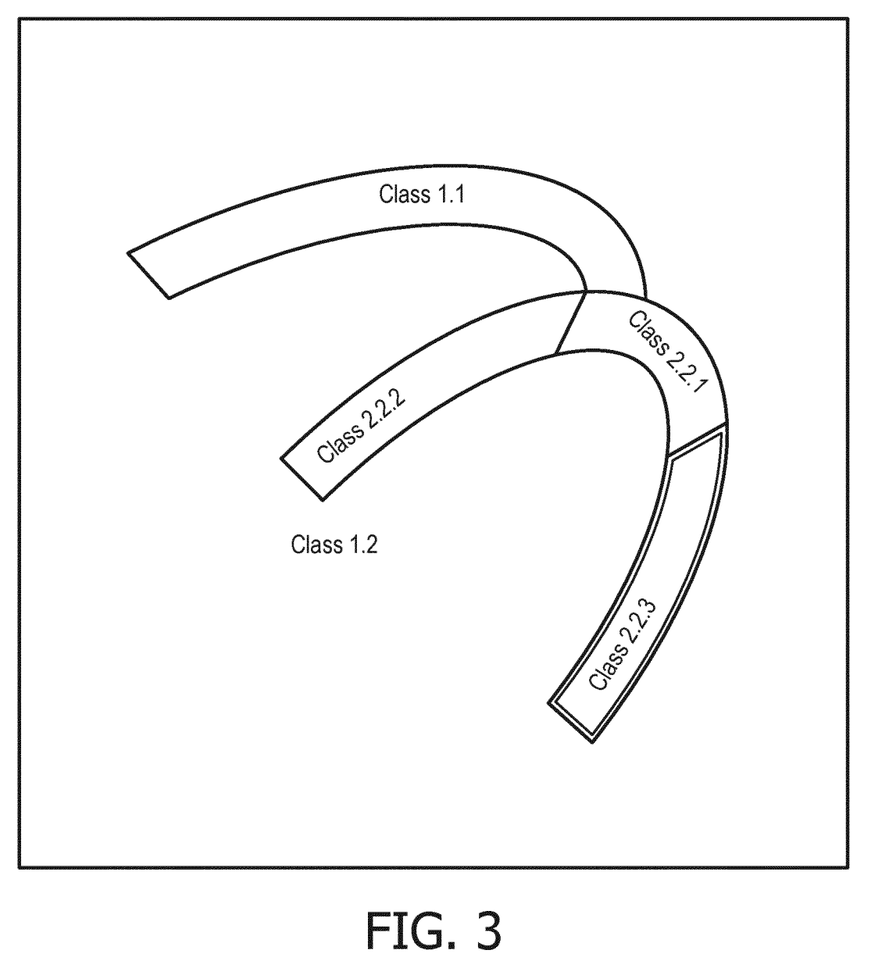
FIG. 3 diagrammatically shows an illustrative anatomical abnormality classification scheme suitably used in the automatic heart segmentation of FIG. 2.

With reference now to FIG. 3, two classes of these three major abnormality classes 30, 32, 34 have been further broken down into sub-classes, as follows. The activity leakage class 34 corresponds to leakage of activity into surrounding organs (other than left ventricle). Such radiotracer leakage is one of the primary reasons for heart segmentation failure. Leakage occurs when uptake in the left ventricle is combined with the uptake in the right ventricle and into other abdominal regions. Shape models are designed to accurately identify these cases and then correct the shape fitting to segment out the myocardial boundary accurately. In illustrative FIG. 3, the activity leakage class 34 is designated as Class 1, and is further divided into two sub-classes: leakage into the right ventricle (Class 1.1); and leakage into the abdominal region (Class 1.2).

With continuing reference to FIG. 3, the missing uptake class 32 is also further divided into sub-classes. Missing uptake is generally defined as reduced or completely missing uptake in the left ventricle. Missing uptake is another common reason for the failures of existing automatic segmentation algorithms. Since myocardial uptake can take various forms, thus it is further divided into two sub-classes: partial uptake (Class 2.1) or no uptake (Class 2.2). 1) Partial uptake (Class 2.1, not indicated in FIG. 3) arises when the myocardial wall has different thickness of uptake. This challenges the myocardial segmentation algorithm to accurately identify the wall thickness. No uptake (Class 2.2) arises when there is missing uptake in portions of myocardial wall. This can occur when certain portions of myocardial wall are ischemic, thus having no uptake. This situation makes it difficult for an automated cardiac segmentation algorithm to define the stopping criteria and to accurately segment the whole myocardial boundary in an automatic fashion. As shown in FIG. 3, the no uptake class (Class 2.2) is further divided into three sub-classes depending on the portion of the myocardial wall that has no uptake: Apical (Class 2.2.1); apical to aortic (i.e. atrial) valve region (Class 2.2.2); and apical to mitral value region (Class 2.2.3).

The classes defined herein with reference to FIGS. 2 and 3 are merely illustrative, and other classes are contemplated. Moreover, the classes are not necessarily mutually exclusive; rather, a given heart image may exhibit features from more than one class, and thus the classifier 60 preferably is a multi-label classifier that can assign more than one class to a given heart image.

Figure 4:
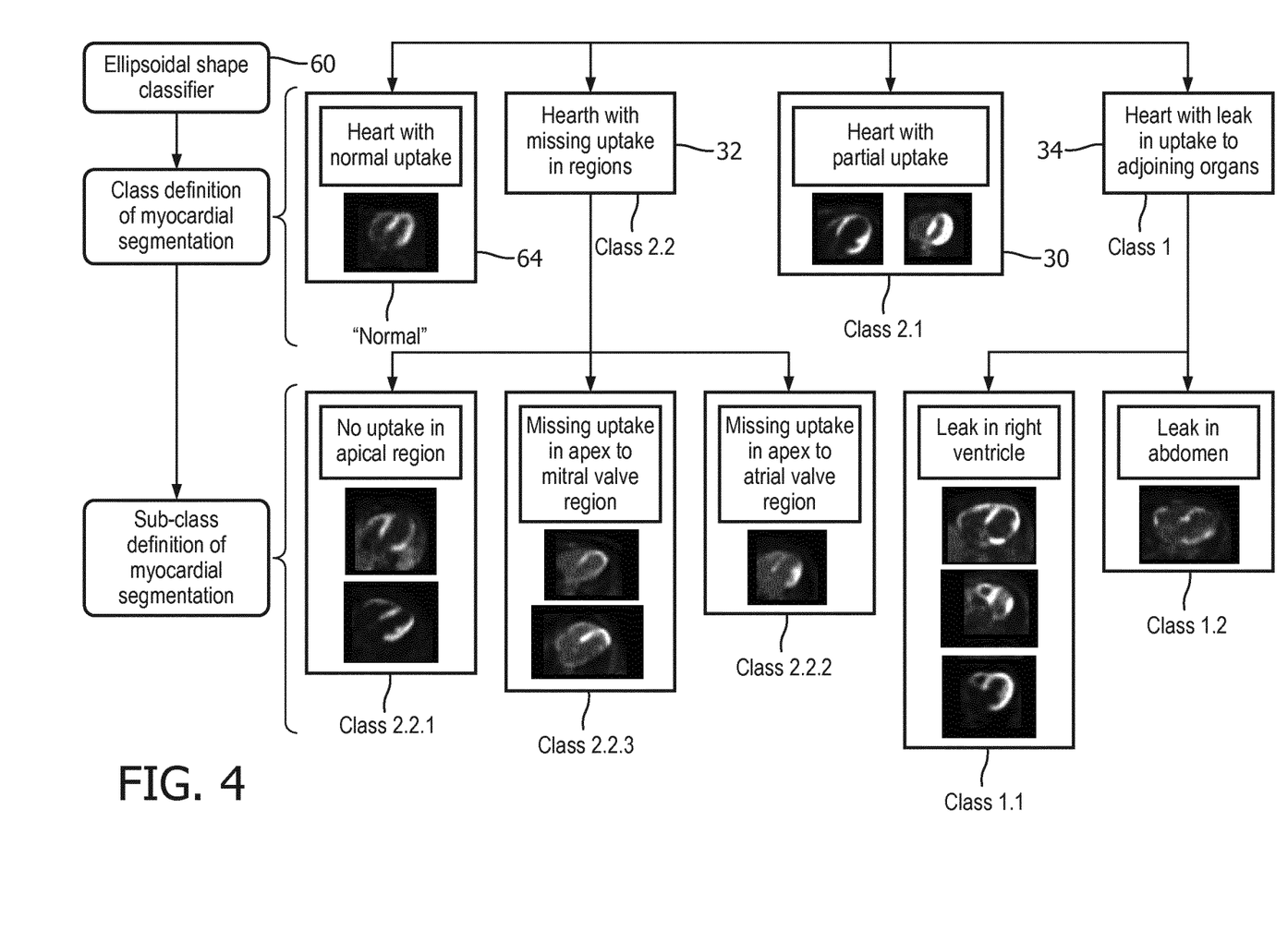
FIG. 4 diagrammatically shows an illustrative anatomical abnormality classification process flow suitably performed by the automatic heart segmentation of FIG. 2 using the anatomical abnormality classification scheme of FIG. 3.

With reference to FIG. 4, some examples of execution of the classifier 60 using the illustrative classification scheme 62 of FIGS. 2 and 3 are presented.

With returning reference to FIG. 2, the segmented left ventricle from the (initial) automatic heart segmentation 22 is fed into an (initial) ellipsoid fitting algorithm 52. The ellipsoid (E1) generated by the (initial) ellipsoid fitting algorithm 52 is used to extract features 54 and then these features are fed into the shape classifier 60 that then determines the class in which the heart image falls. In the operations 66, 68 and optional operation 76, the segmentation algorithm is then tuned and corrected (if required) for that class. In an illustrative embodiment, the features presented in Table 1 are the components of the feature vector on which the shape classifier 60 operates.

TABLE 1

Features of the feature vector

| Feature type | Features |
| --- | --- |
| Axis length of the three axes of ellipsoid E1 | A(x), B(y), C(z) |
| Azimuth and elevation angles of ellipsoid E1 | |
| Center of mass of segmented left ventricle | COM |
| Center of mass of the ellipsoid E1 | COM2 |

Figure 5:
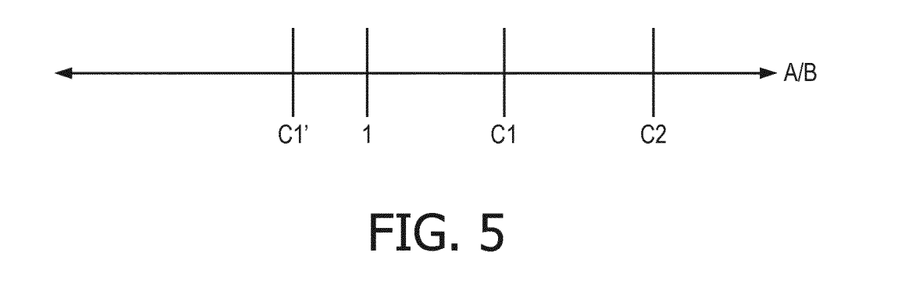
FIG. 5 diagrammatically shows an approach for associating the ellipsoid fitted in the classification process of FIG. 4 to an anatomical abnormality class of the classification scheme shown in FIG. 3.

With reference to FIG. 5 and to Table 2, several axis conditions that are used to determine the class of the heart image are presented in Table 2. Other conditions are also used to fine tune the accurate class identification and is used in correcting the segmentation. In Table 2, C1, C1', C2 and C3 are empirically derived thresholds values (e.g. determined from a set of training images each labeled by a physician as to the abnormality). Abs(.) denotes absolute value. A and B are major and minor axis length of the ellipsoid. FIG. 5 diagrammatically shows the A/B ratio of ellipsoid and the range used to determine the classes tabulated in table 2.

TABLE 2

Classification definitions

| Elliptical condition | Class identification |
| --- | --- |
| C1 < A/B < C2 | Normal |
| Abs(COM-COM2) > C3 | Partial uptake (Class 2-1) |
| A/B > C2 | Class 2-2-2, Class 2-2-3 |
| C1' < A/B < C1 | Leak in Right Ventricle (Class 1-1) |
| A and B larger than normal | Leak in abdomen (Class 1-1) |
| A/B < C1' | Class 2-2-1 |

Figure 6:
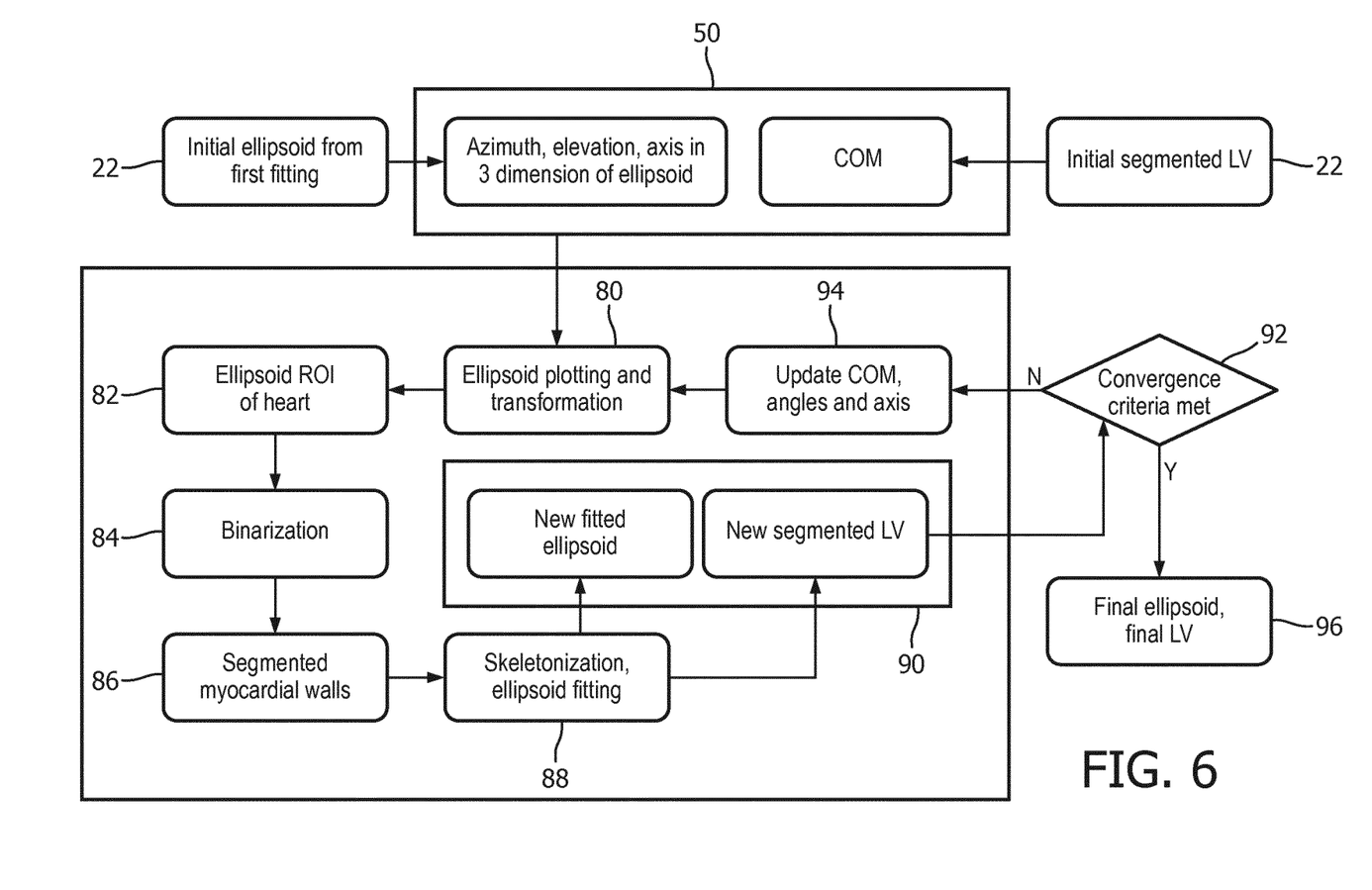
FIG. 6 diagrammatically shows an iterative approach for the ellipsoid fitting.

With reference to FIG. 6, an example of the ellipsoidal fitting algorithm 52 employing iterative processing is described. The automatic left ventricle segmentation algorithm 22 generates the parameters 50 including the initial center of mass (COM) also generates azimuth and elevation angles of the (initially) segmented heart. In some embodiments, the COM and the angles 50 are then used by the iterative ellipsoidal fitting algorithm 52 as initial values for these ellipsoid parameters to start the adaptive shape fitting algorithm. The axis length of the initial ellipsoid each of the three reference dimensions (x, y, z) are obtained from the first fitted ellipsoid. Voxels are considered from the COM of the heart (spanning in either direction in all three axes); the ellipsoid is plotted using the ellipsoid equation below:

$$\frac{x^2}{a^2} + \frac{y^2}{b^2} + \frac{z^2}{c^2} \leq 1$$

All the pixels within the ellipsoid are kept. In an operation 80, all plotted ellipsoid pixels are then rotated with first azimuth, and then elevation angle. Both ceil and floor pixels are used to avoid introducing holes in the rotation process. Two-dimensional (2D) rotation equations are used to move the pixel at appropriate locations in 3D. The resulting modeled ellipsoid 82 is then used to mask the heart from the input reconstructed PET volume. The masked ROI is thresholded 84 and the heart walls 86 are extracted. The heart is then skeletonized in an operation 88, and ellipsoid fitting algorithm is re-applied in an operation 90 as in the adapted LV segmentation algorithm. The newly generated COM and azimuth, elevation angles and ellipsoidal axis in three dimensions are stored. A fitting criterion 92 is applied using the newly generated COM and ellipsoidal axes. If fitting algorithm fails, then with the newly stored values 94 the algorithm iterates by flow return to operation 80. If the fitting criterion 92 is satisfied then the final ellipsoid 96 is output. In one suitable embodiment, the criteria 92 for stopping the iterative ellipsoid fitting algorithm are defined as: (1) difference between consecutive COM in X and Y dimension must fall within a limit; and (2) difference between the ellipsoid axis length in X and Y dimension must be within a reasonable limit as it defines the correctness or biasness of the segmentation algorithm.

The described examples are merely illustrative, and numerous parameters are contemplated for inclusion in the feature vector representing the anatomical structure, e.g. one or more features representing distribution of segmented myocardial pixels across the slices of heart in an axial dimension, total number of segmented myocardial pixels, a total range of a bounding box for segmented myocardium, or so forth.

In the illustrative examples, the anatomical structure is a heart. More generally, the anatomical structure may be the heart, lungs, brain, or so forth, and the disclosed image segmentation process is performed on the anatomical structure in a medical image depicting activity of a radiopharmaceutical in an imaged patient. The classification is assigned from a set of classifications including one or more activity leakage classification(s) and one or more partial or missing activity uptake classification(s). By way of further illustration, in the case of brain imaging and segmentation in accord with the foregoing, the radiotracer may be chosen and/or administered in such a way as to target neural tissue and/or cerebrospinal fluid (CSF). The set of classifications in this case may include classifications representing activity leakage into non-brain tissue, partial or missing activity uptake into the left hemisphere of the brain, and partial or missing activity uptake into the right hemisphere of the brain, with these latter classifications optionally broken down into finer-grained abnormality classes, e.g. missing versus partially missing activity, partial or missing activity uptake into the frontal lobe of the left (or right) hemisphere, and so forth.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An image processing device comprising:
   an electronic processor; and
   at least one non-transitory storage medium storing instructions readable and executable by the electronic processor to perform an image segmentation process on a medical image, the image segmentation process including:
   performing image segmentation to generate an initial segmented representation of an anatomical structure in the medical image;
   fitting parameters of a geometric shape to the anatomical structure in the medical image to produce initial fitted shape parameters;
   assigning a classification for the anatomical structure in the medical image using at least one classifier operating on the initial fitted shape parameters and the initial segmented representation of the anatomical structure, wherein the classification is assigned from a set of classifications including at least one activity leakage classification and at least one partial or missing activity uptake classification; and generating a final segmented representation of the anatomical structure in the medical image by operations including repeating the image segmentation using the classification which is assigned from a set of classifications including at least one activity leakage classification and at least one partial or missing activity uptake classification as prior knowledge.

2. The image processing device of claim 1 wherein the anatomical structure is a heart and the geometric shape is an ellipsoid wherein fitting parameters of the ellipsoid to the heart in the medical image includes fitting ellipsoid axis length parameters, ellipsoid angle parameters, and an ellipsoid center-of-mass parameter; and wherein the classifier operates on features representing the heart including a fitted center-of-mass parameter of the ellipsoid, at least two fitted axis length parameters of the ellipsoid, and a center-of-mass of the initial segmented representation of the heart, and at least one of distribution of segmented myocardial pixels across the slices of heart in an axial dimension, total number of segmented myocardial pixels, and a total range of a bounding box for segmented myocardium.

3. The image processing device of claim 1 wherein the assigning of the classification includes:
assigning a plurality of binary classification values for the anatomical structure in the medical image using a corresponding plurality of binary classifiers.

4. The image processing device of claim 1 wherein the fitting of parameters of the geometric shape to the anatomical structure in the medical image includes, prior to the fitting, initializing at least one parameter of the geometric shape based on the initial segmented representation of the anatomical structure; and the initializing includes:
initializing a center of mass parameter of the geometric shape to the center of mass of the initial segmented representation of the anatomical structure.

5. The image processing device of claim 1 wherein generating the final segmented representation of the anatomical structure includes:
adjusting the fitted parameters of the geometric shape based on the classification to generate a fitted classification-specific geometric shape;
wherein the repeating of the image segmentation uses the classification-specific geometric shape as a mask.

6. The image processing device of claim 1 wherein the at least one non-transitory storage medium storing further instructions readable and executable by the electronic processor to perform a motion correction process including (i) performing the image segmentation process on the medical images of a time sequence of medical images and (ii) correcting the medical images of the time sequence of medical images for motion determined from the final segmented representations of the anatomical structure in the medical images of the time sequence of medical images.

7. A non-transitory storage medium storing instructions readable and executable by an electronic processor to perform an image segmentation process on an anatomical structure in a medical image depicting activity of a radiopharmaceutical in an imaged patient, the image segmentation process including:
fitting parameters of a geometric shape to the anatomical structure in the medical image to produce initial fitted shape parameters;

assigning a classification for the anatomical structure in the medical image using at least one classifier operating on at least the initial fitted shape parameters wherein the classification is assigned from a set of classifications including at least one activity leakage classification and at least one partial or missing activity uptake classification; and performing image segmentation to generate a segmented representation of the anatomical structure in the medical image using the classification which is assigned from a set of classifications including at least one activity leakage classification and at least one partial or missing activity uptake classification as prior knowledge in performing the image segmentation.

8. A non-transitory storage medium storing instructions readable and executable by an electronic processor to perform an image segmentation process on a heart in a medical image depicting activity of a radiopharmaceutical in an imaged patient, the image segmentation process including:
fitting parameters of an ellipsoid to the heart in the medical image to produce initial fitted shape parameters including fitting major and minor ellipsoid axis length parameters, ellipsoid angle parameters, and an ellipsoid center-of-mass parameter;

assigning a classification for the heart in the medical image using at least one classifier operating on at least the initial fitted shape parameters including at least the fitted major and minor ellipsoid axis length parameters wherein the classification is assigned from a set of classifications including at least one activity leakage classification and at least one partial or missing activity uptake classification; and performing image segmentation to generate a segmented representation of the heart in the medical image using the classification which is assigned from a set of classifications including at least one activity leakage classification and at least one partial or missing activity uptake classification as prior knowledge in performing the image segmentation.

9. The non-transitory storage medium of claim 8 wherein the at least one classifier operates on features representing the heart including a fitted center-of-mass parameter of the ellipsoid and at least two fitted axis length parameters of the ellipsoid.

10. The non-transitory storage medium of claim 8 wherein the at least one activity leakage classification includes:
a classification representing activity leakage into a right ventricle, and
a classification representing activity leakage into an abdomen.

11. The non-transitory storage medium of claim 10 wherein the at least one partial or missing activity uptake classification includes:
a classification representing partial or missing activity uptake into an apical region,
a classification representing partial or missing activity uptake into a region located between apical and aortic valves, and
a classification representing partial or missing activity uptake into a region located between apical and mitral valves.

12. The non-transitory storage medium of claim 11 wherein:
prior to performing the image segmentation, the fitted parameters of the geometric shape are adjusted based on the classification to generate a fitted classification-specific geometric shape;

wherein the image segmentation uses the classification-specific geometric shape as a mask.

13. The non-transitory storage medium of claim 7 wherein the image segmentation process further includes:
performing initial image segmentation to generate an initial segmented representation of the heart in the medical image;
wherein prior to the fitting, at least one parameter of the geometric shape is initialized based on the initial segmented representation of the heart.

14. The non-transitory storage medium of claim 13 wherein the at least one classifier operates on features representing the heart including a feature comprising a center of mass of the initial segmented representation.

15. The non-transitory storage medium of claim 7 further storing instructions readable and executable by the electronic processor to perform a motion correction process including (i) performing the image segmentation process on the medical images of a time sequence of medical images and (ii) correcting the medical images off the time sequence of medical images for motion determined from the final segmented representations of the heart in the medical images of the time sequence of medical images.

16. The non-transitory storage medium of claim 7 wherein the medical image is a positron emission tomography (PET) or single photon emission computed tomography (SPECT) image, the anatomical structure is a heart and the classification normal classification, a partial radiotracer uptake classification, a missing uptake region classification, and at least one radiotracer leak classification.

17. The image segmentation method of claim 7, wherein the geometric shape is an ellipsoid.

* * * * *